Figure 1:
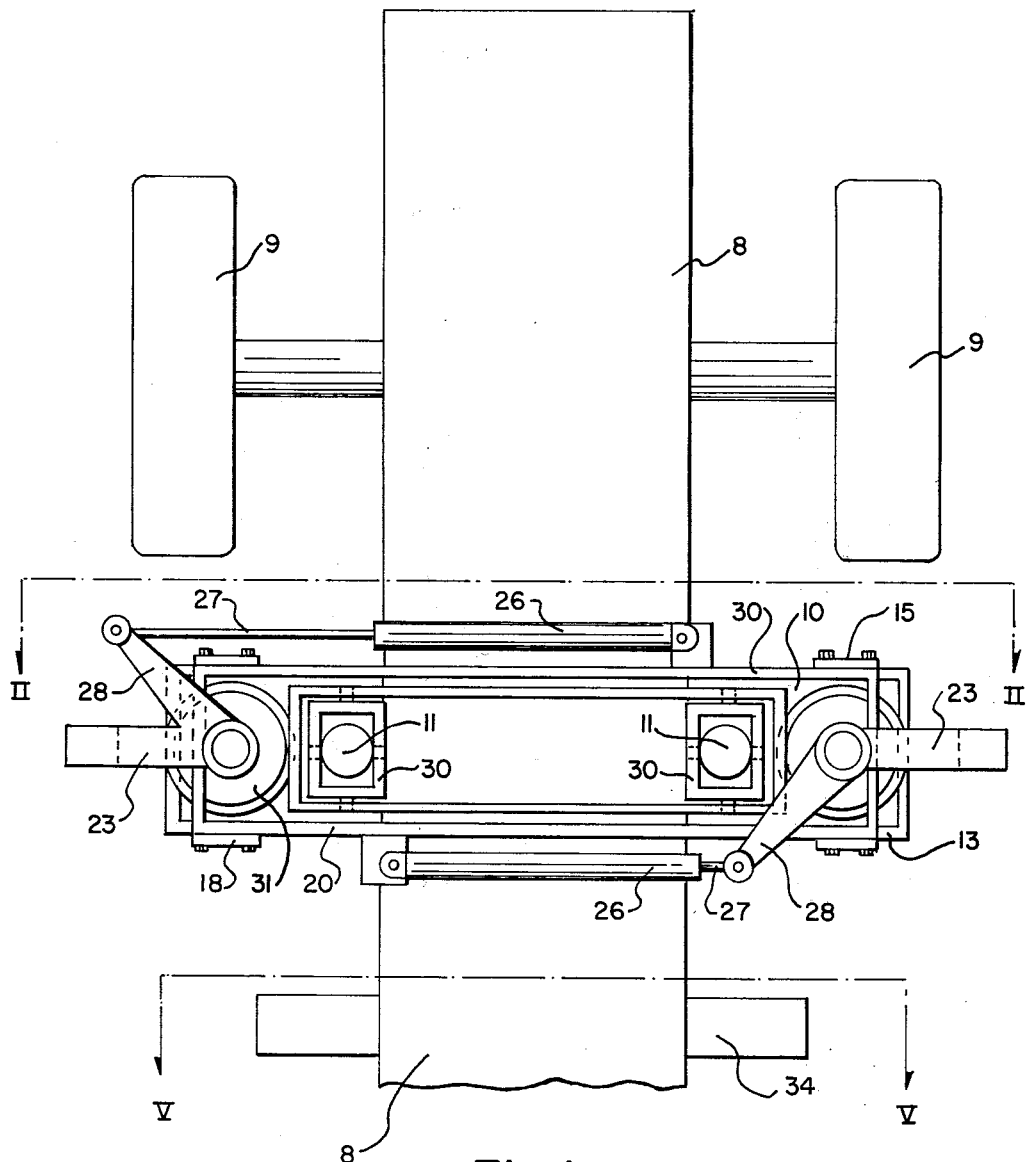

United States Patent [19]

Brock

[11] 4,054,217

[45] Oct. 18, 1977

[54] LOAD-LIFTING ASSEMBLY

[76] Inventor: Gibson E. Brock, R.D. No. 5, Persimmon Road, Sewickley, Pa. 15143

[21] Appl. No.: 783,332

[22] Filed: Mar. 31, 1977

Related U.S. Application Data

[63] Continuation-in-part of Ser. No. 717,647, Aug. 25, 1976, abandoned.

[51] Int. Cl.² .............................................. B60P 3/00
[52] U.S. Cl. ..................................................... 214/392
[58] Field of Search ............................... 214/390–394, 214/75 R, 75 H, 731

[56] References Cited

U.S. PATENT DOCUMENTS

| 1,757,798 | 5/1930 | Grab | 214/392 |
| 2,512,333 | 6/1950 | Jaffa et al. | 214/392 |
| 3,184,087 | 5/1965 | Prindle et al. | 214/392 |

FOREIGN PATENT DOCUMENTS

| 2,336,710 | 2/1975 | Germany | 214/392 |

Primary Examiner—Robert J. Spar
Assistant Examiner—Lawrence E. Williams
Attorney, Agent, or Firm—Buell, Blenko & Ziesenheim

[57] ABSTRACT

A load-lifting assembly adapted to be attached to the bed of a trailer vehicle comprises a mounting platform affixed to the bed, a pair of hydraulic cylinders attached to the mounting platform with their piston rods extending below the mounting platform on each side, and a cross member attached to those piston rods and extending crosswise of the bed. An inverted U-shaped structure is carried by the cross member, the legs of the U extending upwardly therefrom at each end, and the cross bar of the U being positioned above the vehicle bed. In each leg of the U is journalled a vertical shaft which extends below the cross member and carries at its lower end a swing load-supporting member which swings from a load-carrying position crosswise of the bed to a load-clearing position parallel with the bed. Means for rotating the vertical shafts are attached to the cross bar of the U, and means are provided for locking those shafts to the vehicle bed.

20 Claims, 9 Drawing Figures

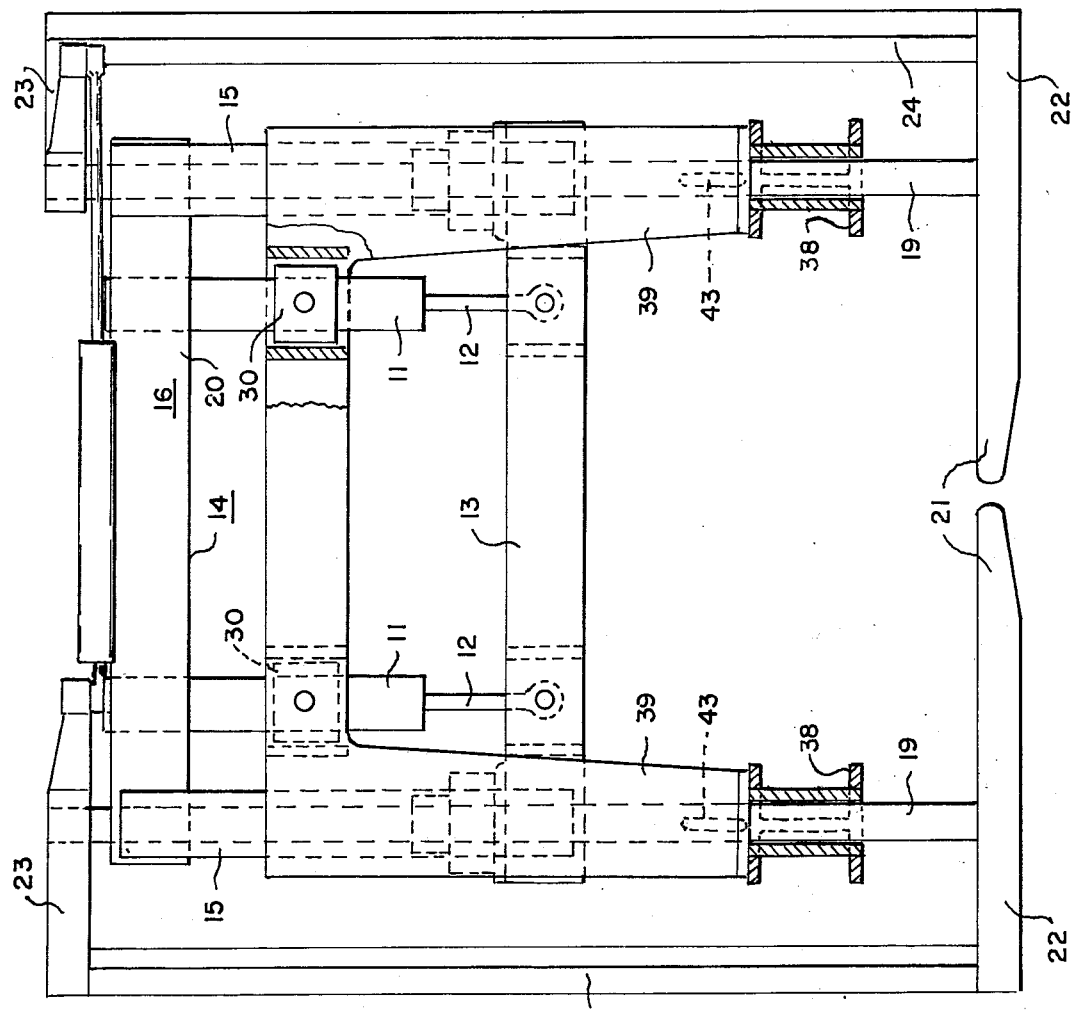
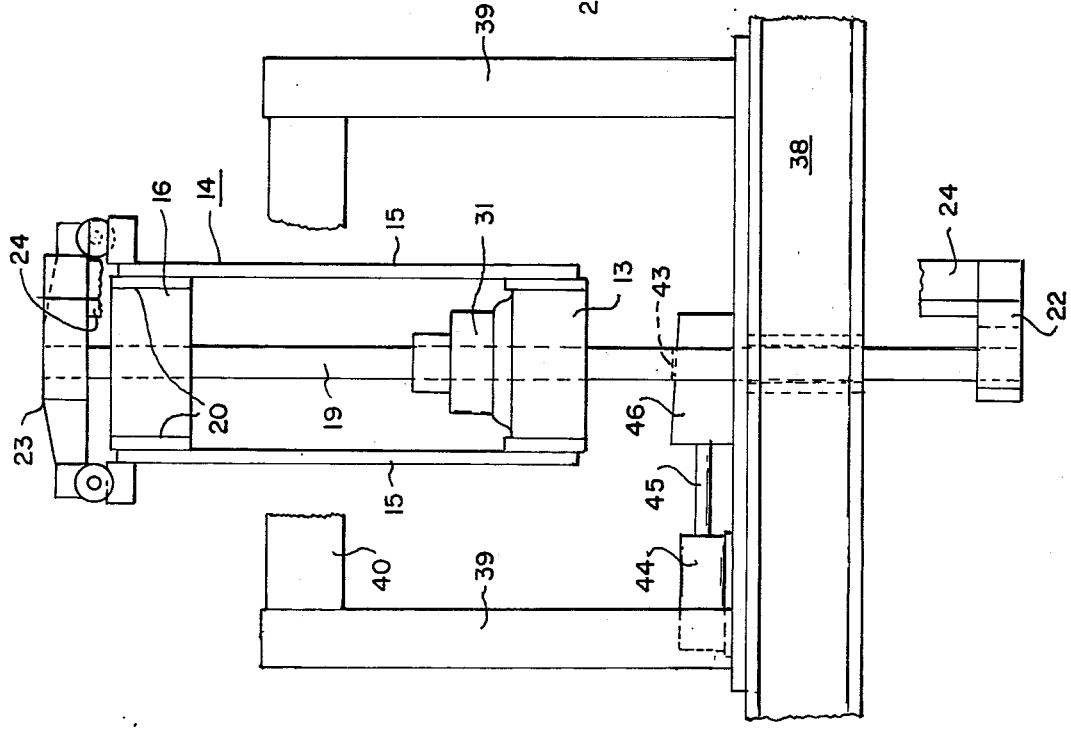

LOAD-LIFTING ASSEMBLY

This application is a continuation-in-part of my application Ser. No. 717,647, filed Aug. 25, 1976, now abandoned.

This invention relates to mobile apparatus for lifting, and carrying in suspension, heavy elongated loads. It is more particularly concerned with a load-lifting assembly for such apparatus which is readily affixed, singly or in multiple, to the bed of a truck, trailer or semi-trailer.

Historically, elongated heavy articles such as steel billets, pipe, structural sections and the like have been transported by rail. In-plant transfer of such loads by rail is, however, expensive and wasteful both of time and manpower. This is in large measure because railroad cars must be loaded and unloaded by auxiliary apparatus, such as overhead cranes. Furthermore, railroad cars can only be brought to the vicinity of the load to the extent that railroad tracks exist there or can be laid there. Track installations are relatively expensive, and where they cannot be justified the load must be brought to the car by auxiliary handling means. Because of these deficiencies of rail handling for in-plant movement of goods, consideration has been given in recent years to the construction of rubber-tired vehicles for transport of the goods over in-plant roadways or even unprepared ground. Examples of such vehicles are the tractor-trailer apparatus of U.S. Pat. No. 3,271,358, captioned, Self-Loading Carrier, issued to Gibson E. Brock on Mar. 20, 1973, and of application Ser. No. 628,769, filed Nov. 4, 1975 by the same inventor, captioned, Self-Loading Carrier with Trailing End Bogie. My invention to be described herein is useful in the construction of apparatus similar to those there disclosed.

The apparatus of my patents comprises an elongated trailer the front end of which is pivotally mounted on a conventional multiple-axle tractor and the rear end of which is pivotally mounted on a remotely controlled bogie. The trailer carries two trolleys, each equipped with a yoke device which can be raised or lowered. The construction of the apparatus allows it to be moved broadside over a load of elongated objects the central portion of which is supported on blocks or mounds of earth. The trolleys are run out so that the yokes clear the ends of the load. The yokes are then lowered to ground level and the trolleys run in until the yokes enclose the load at each end. The trailer apparatus of the patents, therefore, must be longer than the load. For many applications, more compact apparatus would be desirable. The assembly of my invention makes possible the economical provision of such apparatus.

It is an object of my invention to provide a load-lifting assembly which is readily attached to the bed of a suitable trailer vehicle to convert it into a carrier for suspended elongated loads. It is another object to provide such an assembly which when maneuvered over the load, automatically engages the load and picks it up, and after the vehicle and load have been moved to the desired new location, automatically puts the load down and disengages from it. It is another object of my invention to provide such an assembly in which the load-supporting members can be locked to the vehicle bed. It is still another object to provide such an assembly which is operated from the hydraulic system of the vehicle. Other objects of my invention will appear in the course of the description thereof which follows.

Two embodiments of my invention are described herein. In general, my assembly comprises a mounting platform or member which extends crosswise of the vehicle bed and is attached thereto by conventional means. A load-lifting mechanism such as a hydraulic cylinder is attached at each end of the mounting platform with its piston rod extending therebelow. Those rods are attached to a cross-member which extends crosswise below the mounting platform. Connected to the cross-member is an inverted U-shaped structure which extends upwardly therefrom on each side of the mounting platform, the cross-bar of the U being positioned above the mounting platform. In each leg of the U is journalled a vertical shaft which extends below the cross-member and carries at its lower end a swing load-supporting member, somewhat like those members disclosed in U.S. Pat. No. 1,757,798, issued to G.A. Grab on May 6, 1930 and U.S. Pat. No. 2,512,333, issued to H. Jaffa, et al. on June 20, 1950. Affixed to the cross-bar of the U are means for rotating those shafts, preferably hydraulic means. Normally, the vehicle with which my assembly is used will be provided with two sets of assemblies spaced from each other on the vehicle bed, but additional assemblies may be employed as required.

Embodiments of my invention presently preferred by me are illustrated in the attached figures to which reference is now made.

Figure 2:
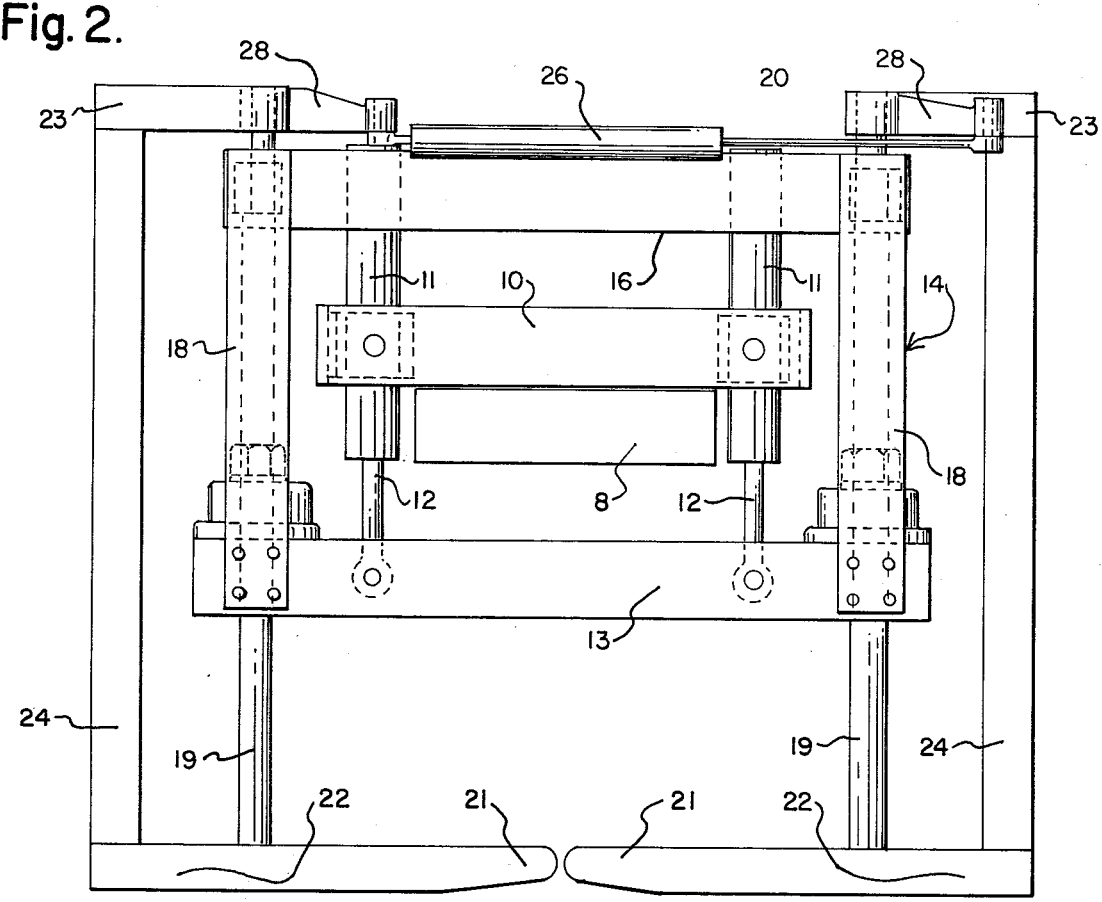
Figure 4:
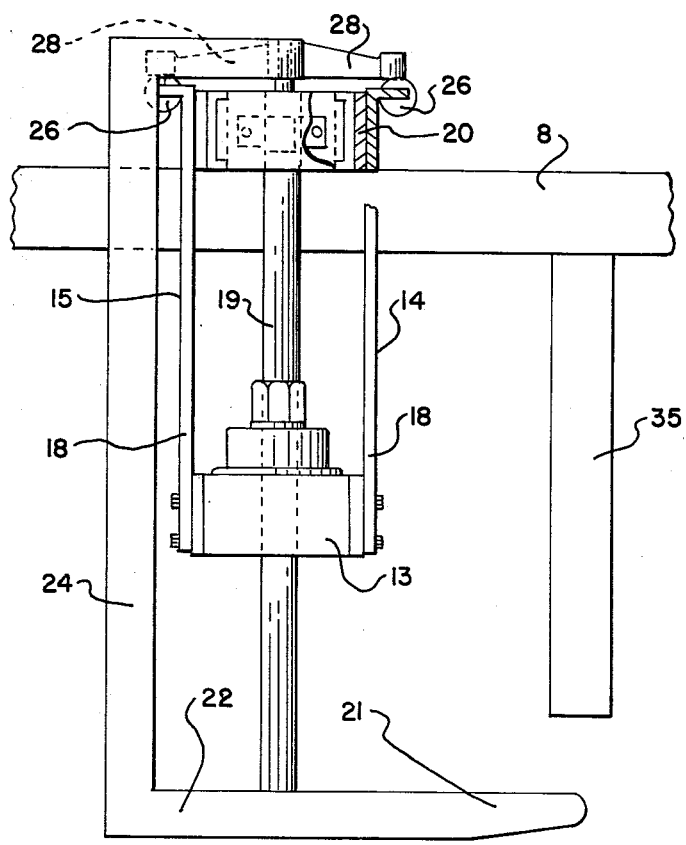
Figure 3:
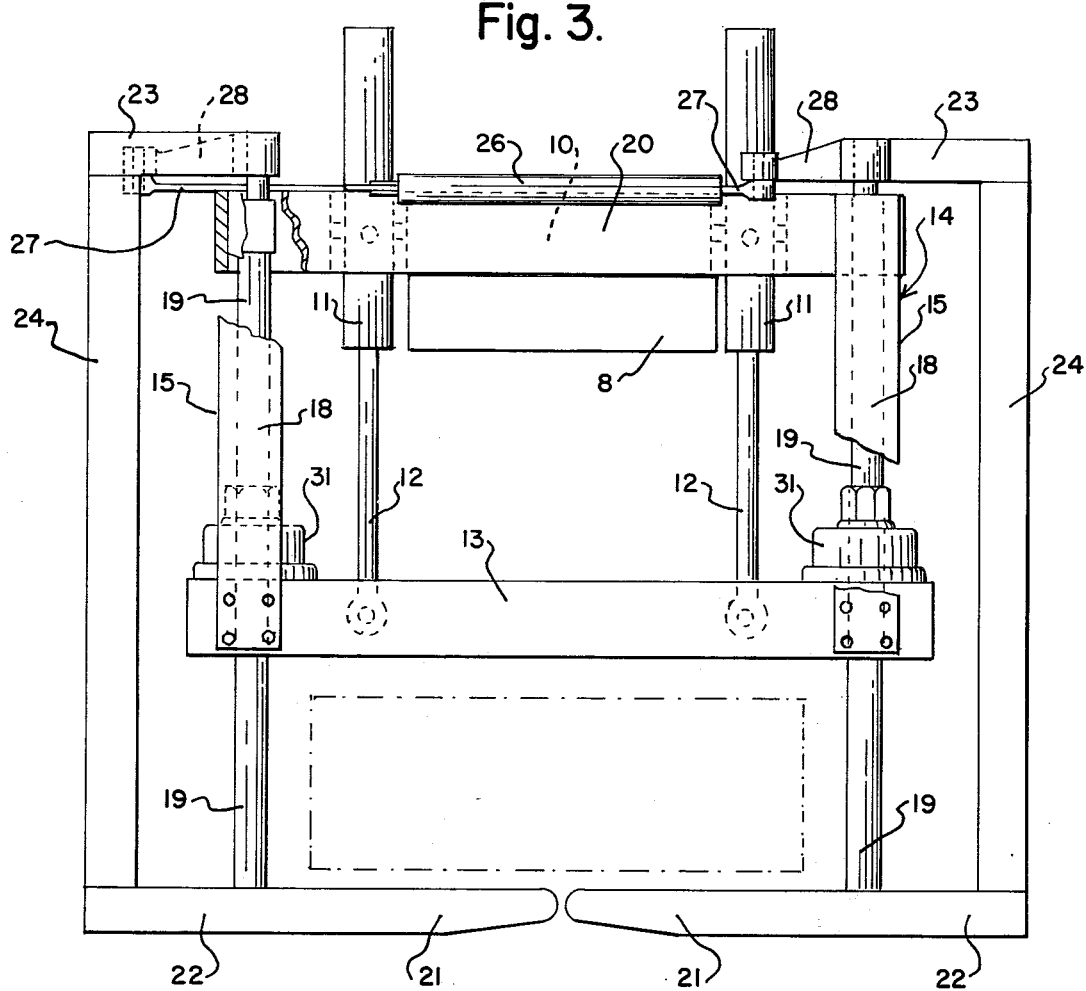
Figure 5:
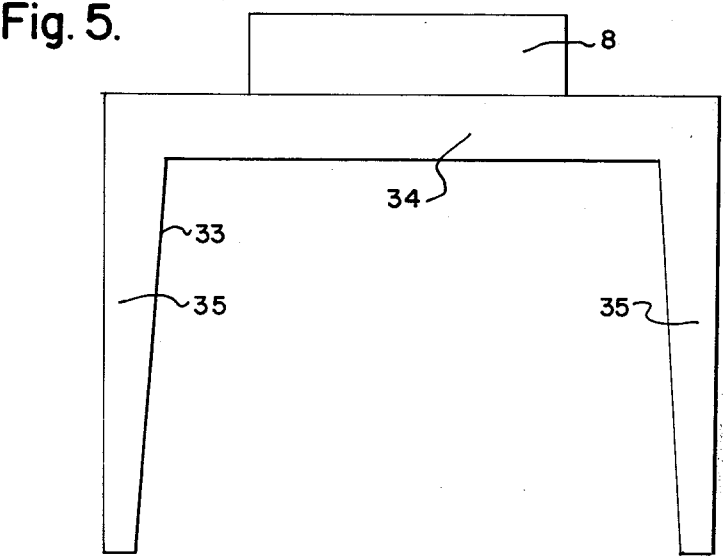
Figure 6:
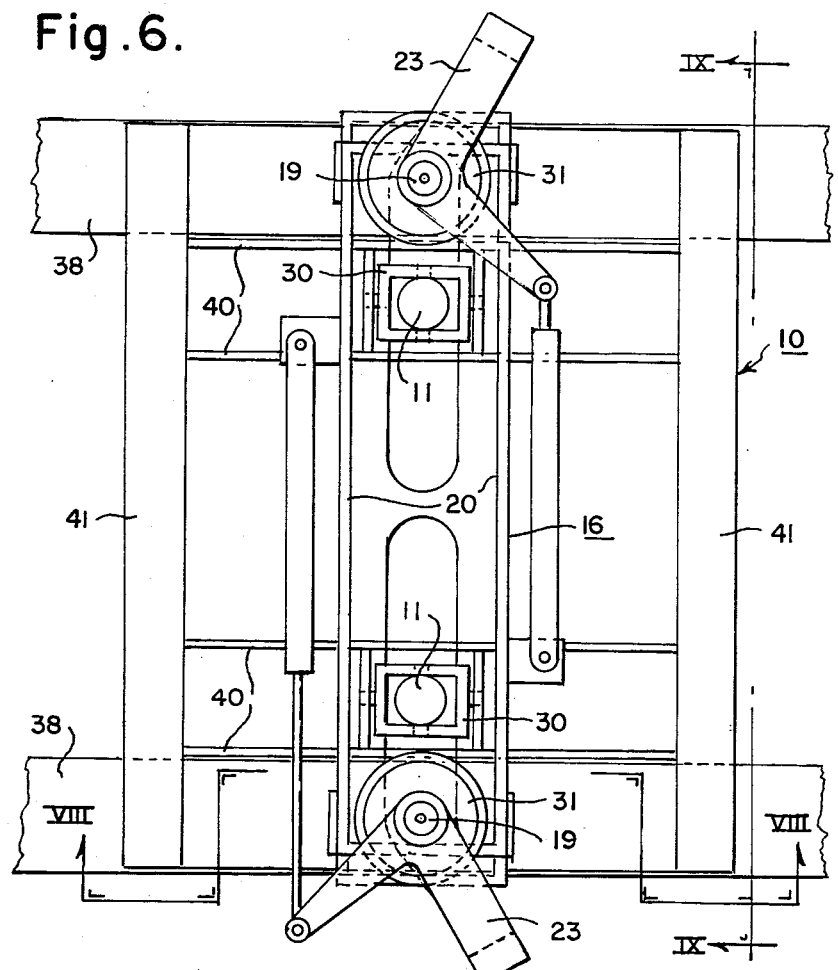
Figure 8:
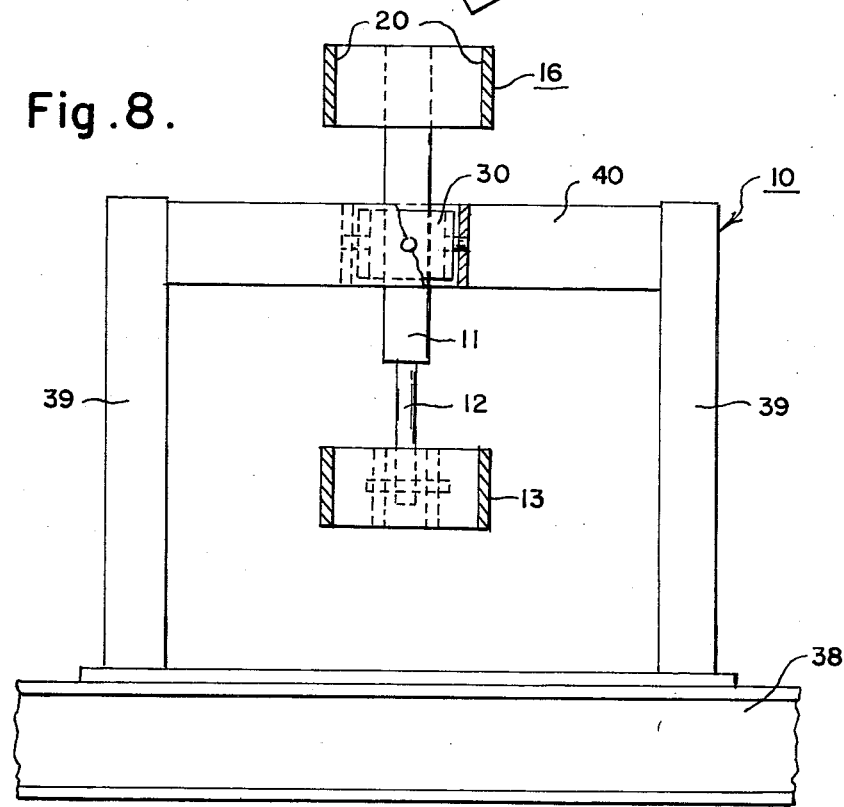

FIG. 1 is a plan view of a first embodiment of the assembly of my invention, positioned on the bed of a trailer vehicle, FIG. 2 is a cross section of the apparatus of FIG. 1 in its traveling position taken on the plane II—II, thereof, FIG. 3 is a view of the apparatus of FIG. 2 in its loading position, broken away in part, FIG. 4 is a side elevation of a portion of the apparatus of FIG. 1, but with the swing load-supporting members in load-clearing position, FIG. 5 is a cross section of the apparatus of FIG. 1 taken on the plane V—V, thereof, FIG. 6 is a plan view of a second embodiment of the assembly of my invention, FIG. 7 is a side elevation of the apparatus of FIG. 6, FIG. 8 is a partial longitudinal cross section of the apparatus of FIG. 6 taken on the plane VIII—VIII thereof, and FIG. 9 is an end elevation of the apparatus of FIG. 6, partly in cross section, taken on the plane IX—IX of that Figure.

My apparatus of FIGS. 1–5, inclusive, is shown mounted on a trailer vehicle comprising an elongated bed 8 and a pair of wheels 9 positioned at the rear end thereof.

A mounting platform or plate 10 which is longer than the width of vehicle bed 8 is provided at each end with an upright hydraulic cylinder 11. Cylinders 11 may extend below the mounting platform 10 a distance not greater than the depth of the vehicle bed 8, and may extend above mounting platform 10. That platform is affixed to vehicle bed 8 so as to abut it crosswise thereof in any convenient manner. Each cylinder 11 has a piston rod 12 extending from the bottom thereof and those rods are detachably connected at their lower ends below bed 8 to a cross-member 13, each end of which extends beyond the ends of mounting platform 10. Cross-member 13 supports above it an inverted U-shaped frame 14 comprising a pair of upright legs 15, one at each end, and a cross-arm 16. The legs 15 are detachably connected at their lower ends to the outer ends of cross-member 13 and are attached at their upper ends to cross-arm 16 at the ends thereof. Cross-arm 16 comprises a pair of parallel members 20 spaced from each other.

Each cylinder 11 is mounted in a cut-out portion of mounting platform 10 in gimbals 30. Each leg 15 is formed by a pair of vertical members 18 spaced from each other as are members 20, and connected at their upper ends to the ends of members 20. Between vertical members 18 a vertical shaft 19 is journalled in a thrust bearing 31 in cross-member 13 and extends below that member and above cross-arm 16. The lower end of shaft 19 terminates in a flat rigid swing load-supporting member 21 which extends at right angles to shaft 19 a distance slightly less than half of the spacing between opposite vertical shafts 19. Member 21 extends in the opposite direction as a considerably shorter rigid arm 22. From the upper end of shaft 19, a rigid arm 23, which may be a duplicate of arm 22, extends parallel to arm 22. The outer ends of arms 22 and 23 are connected by a vertical brace 24.

Above the cross-arm 16 parallel thereto and each connected at one end to a member 20 thereof is a pair of hydraulic cylinders 26, each having an oppositely projecting piston rod 27. Each vertical shaft 19 at its upper end carries a crank arm 28 projecting at an angle to arm 23. Each piston rod 27 is connected at its outer end to the outer end of a crank arm 28.

Affixed to the vehicle bed 8 at its lower surface is a transverse stop element 34, which extends beyond bed 8 on each side. Stop 34 is positioned close to mounting plate 10. From each end of stop 34, vertical stop elements 35 project downwardly to a position approximately that of the upper surface of swing arms 21 in their loaded position. The inner faces 33 of elements 35 taper inwardly toward stop 34 so that the spacing between them is less adjacent that stop than it is at their lower ends.

As I have mentioned, two or more of my assemblies above described may be mounted on a vehicle bed to furnish article load engaging and lifting means therefore. An assembly is installed by first detaching cross-member 13 from piston rods 12 of hydraulic cylinders 11 and from upright legs 15 of frame 14. Swing load-carrying arms 21 are moved to their position parallel to the vehicle bed, shown in FIG. 4. The assembly, less cross-member 13, is then lifted by a hoist and set down with mounting platform 10 crosswise of the vehicle bed at the desired location and cylinders 11 straddling that bed. Cross-member 13 is then attached to upright legs 15 and pistons 12 below the vehicle bed, and mounting platform 10 is affixed to that bed. Hydraulic cylinders 11 and 26 are connected to the source of hydraulic fluid under pressure which is carried by the vehicle. Cylinders 11 require such connections at their lower ends only, but cylinders 26 require such connections at both ends.

My assembly is made ready for loading by swinging load-carrying arms 21 parallel to the vehicle bed as has been mentioned. This is accomplished by admitting hydraulic fluid into the appropriate ends of cylinders 26. Those piston rods are caused to move, moving cranks 28 oppositely as seen in FIG. 1 through a 90° arc. Hydraulic fluid is admitted to cylinders 11 causing them to raise cross-member 13 and frame 14 until cross-member 13 comes up against the bottom of the vehicle bed 8. The vehicle is then maneuvered over the load, which must be supported on blocks at each end or rest across ditches scraped out beneath both ends. The supply of fluid under pressure to cylinder 11 is then cut off, which allows cross-member 13 and frame 14 to descend and load-supporting members 21 to reach their lowest position just above ground level. Members 20 of cross arm 16 are spaced from each other a distance greater than the width of mounting platform 10 and extend beyond that plate at each end so that cross arm 16 in its lower most position telescopes over mounting platform 10 and rests on truck bed 8. Hydraulic fluid is then admitted to the other ends of cylinders 26, which causes shafts 19 to rotate and swing load-supporting members 21 under the load. Hydraulic fluid is then admitted to cylinders 11, which raise frame 14, load-carrying arms 21 and their load to traveling position.

The only guides for frame 14 in its upward and downward movement are hydraulic cylinders 11. The gimbals 30 previously described, by means of which cylinders 11 are mounted in mounting platform 10, allow those cylinders to rock a certain amount in any direction with respect to mounting platform 10. Cylinders 11 thus adjust themselves to tilting of frame 14. Road grades and inequalities in road surfaces are thereby accommodated. When members 21 carry load, the major fraction of the weight supported by cylinders 11 lies below mounting platform 10 and so tends to stabilize the apparatus.

Braces 24 transfer some of the bending movement on load-carrying arms 21 to arms 23 at the top of frame 14. It is not essential that braces 24 be parallel to shafts 19. Arms 23 may be reduced in length so that braces 24 become diagonal braces.

Transverse load stop 34 is useful in leveling out a load comprising a pile of elongated articles, such as billets. These are not always stacked carefully and when they are, the pile is sometimes disturbed when it is picked up by the swing load arms 21 or is jostled in travel. Such a load is raised by cylinders 11 against transverse stop 34 which, of course, exerts a restraining force on the topmost articles in the load and so levels the top of the load. Vertical load stops 35, on the other hand, because of the inward taper of their inside surfaces 36, tend to push together articles that have spread out from the pile. The combined effect of the horizontal and vertical load stops is to form the articles into a compact load of trapezoidal cross section.

The embodiment illustrated in FIGS. 6 through 9 is similar in many respects to the first embodiment described hereinabove and like parts of the two carry like reference characters. This second embodiment is especially adapted for vehicles having beds comprising a pair of side members 38 spaced from each other so that a load can be accommodated between them. Platform 10, instead of abutting the vehicle bed as in my embodiment first described, comprises a pair of legs 39 positioned upright on one side member 38 and a like pair of legs 39 positioned on the other side member. A cross member 41 connects the tops of one pair of opposite legs 39 on both side members and a like cross member 41 connects the tops of the other pair of opposite legs 39. Cross members 41 are connected by pairs of longitudinal members 40 spaced slightly inwardly from side members 39. Centrally located in each pair of longitudinal members 40 is a gimbal 30 which mounts a hydraulic cylinder 11 with piston rod 12 extending downwardly and connected to cross member 13. The latter is positioned below longitudinal members 40 of platform 10, but above side members 38 of the vehicle bed.

Cross member 13, as before, supports above it an inverted U-shaped frame 14 comprising a pair of upright legs 15, one at each end, and a cross-arm 16. The legs 15 are connected at their lower ends to the outer ends of cross-member 13 and are attached at their upper ends to cross-arm 16 at the ends thereof. Cross-arm 16 comprises a pair of parallel members 20 spaced from each other. Also, as before, a pair of vertical shafts 19 is journalled in thrust bearings 31 positioned at each end of cross member 13. Shafts 19 extend upwardly through cross arm 16 and downwardly through side members 38 where clearance is provided for rotation and for vertical sliding movement therein. At their lower ends they terminate in horizontally disposed swing load-supporting members 21. Members 21 also extend from shafts 19 in the opposite direction as arms 22, but an angle of 135° from members 21. Rigid arms 23 which extend outwardly from the upper ends of shafts 19 parallel arms 22. The outer ends of arms 22 and 23 are connected by vertical braces 24. The mechanism for rotating shafts 19 is the same as is described herein for my first embodiment.

Shafts 19 are formed with slots 43 positioned to be above the vehicle side members 38 when my apparatus is in its load-carrying position as is shown in FIGS. 7 and 9. Horizontally mounted on each side member 38 is a hydraulic cylinder 44 having a piston rod 45 connected to a wedge 46 dimensioned to fit within slot 43 when it is aligned therewith and to rest on the upper surface of side member 38. As is shown in FIG. 9, the inside faces of legs 39 taper slightly toward the center line of the vehicle from bottom to top so that the spacing between them is less at their upper ends than at their lower ends.

In the operation of my apparatus it is made ready for loading by swinging load-supporting arms 21 parallel to and beneath side members 38 in the way described herein for my first embodiment. It will be evident that arms 22 and 23 must be at an angle less than 180° to arms 21 to permit the latter to lie below side members 38. Hydraulic fluid is admitted to the lower ends of hydraulic cylinders 11, so raising cross member 13 and everything carried by it until load-carrying arms 21 are in their highest position, against the bottom faces of side members 38. The vehicle is then maneuvered over the load and load-carrying arms 21 are lowered until they are below the bottom of the load when they are swung beneath it at right angles to side members 38. They are then raised to their load-carrying position shown in FIGS. 7 and 9 and hydraulic cylinders 44 are operated to move wedges 46 through slots 43, so causing the load to be carried by side members 38 of the vehicle. The load is carried between those side members and between legs 39, the converging inner faces of which tend to push together or compact the several articles of the load.

Each embodiment of my invention described hereinabove has its own advantages. The first embodiment may be easily mounted on a conventional trailer vehicle bed and removed therefrom. The second embodiment, although demountable, is better adapted for permanent installation on a trailer vehicle bed of the type described and is constructed so that the trailer bed carries the load directly rather than through the lifting cylinders.

In the foregoing specification I have described presently preferred embodiments of my invention; however, it will be understood that my invention can be otherwise embodied within the scope of the following claims.

I claim:

1. A load-lifting assembly adapted for installation on a vehicle bed for picking up loads blocked therebelow and carrying them, comprising a mounting platform adapted to be attached to the vehicle bed, a pair of lifting means affixed at opposite sides of the mounting platform, a cross member disposed below the mounting platform and connected to the lifting means so as to be moved toward and away from the mounting platform thereby, an inverted U-shaped frame disposed above the mounting platform crosswise thereof with each leg connected at its lower end to an end of the cross member, a vertical shaft mounted for rotation in each leg of the frame and extending below the cross member, a swing load-supporting member affixed to the lower end of each shaft normal thereto, and means mounted on the U-shaped frame adapted to rotate the vertical shafts through an arc of at least 90°.

2. Apparatus of claim 1 in which the cross-member is detachably connected to the lifting means and the legs of the inverted U-shaped frame are detachably connected to the cross-member.

3. Apparatus of claim 1 in which the means adapted to rotate the vertical shafts are mounted on the cross-arm of the U-shaped frame.

4. Apparatus of claim 1 in which the mounting platform abuts the vehicle bed.

5. Apparatus of claim 4 in which the cross-arm of the frame comprises a pair of members spaced apart so as to straddle the mounting platform when the frame is in its lowermost position.

6. Apparatus of claim 1 in which each leg of the frame comprises a pair of spaced-apart members and the vertical shaft is mounted therebetween.

7. Apparatus of claim 1 in which each swing load-supporting member extends in opposite directions from its shaft, and including an upright brace disposed outside the frame attached at its lower end to the end of the swing load-supporting member opposite its load-supporting end and at its upper end to the upper end of the shaft.

8. Apparatus of claim 1 in which the lifting means are hydraulic cylinders.

9. Apparatus of claim 8 in which the hydraulic cylinders extend below the mounting platform and are supported therein by gimbals so that the cylinders are adapted to rock therein in any direction.

10. Apparatus of claim 9 in which the hydraulic cylinders are the only guide means for up-and-down movement of the inverted U-shaped frame.

11. Apparatus of claim 1 in which the means for rotating the vertical shafts are hydraulic means.

12. Apparatus of claim 1 including, in combination, a vehicle bed and load stop elements affixed to the vehicle bed on opposite sides thereof and extending there below intermediate the vertical shafts and the vehicle bed.

13. Apparatus of claim 12 in which the spacing between the lower ends of the load stop elements crosswise of the vehicle bed is greater than the spacing between those elements at the vehicle bed, whereby loads of multiple elongated articles carried by the swing load-supporting members and lifted by the lifting means are compacted by the load stop elements when so lifted.

14. Apparatus of claim 1 in which the mounting platform and the cross member extend beyond the vehicle bed on both sides and the lifting means are affixed to the mounting platform outside the vehicle bed.

15. Apparatus of claim 1 in which the cross member is disposed below the vehicle bed.

16. Apparatus of claim 1 in which the mounting platform is spaced above the vehicle bed by upright members and the vertical shafts pass through the vehicle bed.

17. Apparatus of claim 16 in which the cross member is disposed above the vehicle bed.

18. Apparatus of claim 16 including a slot in each vertical shaft, wedge means adapted to support the vertical shafts from the vehicle bed when inserted into the slots, and means for moving the wedge members into the slots and retracting them therefrom when wedge and slot are aligned.

19. Apparatus of claim 16 including in combination a vehicle bed comprising a pair of side members spaced apart from each other, and in which the vertical shafts pass through the side members.

20. Apparatus of claim 19 in which the spacing between the lower ends of the upright members crosswise of the vehicle bed is greater than the spacing between those members at the mounting platform, whereby loads of multiple elongated articles carried by the swing load-supporting means and lifted by the lifting means are compacted by those upright members when so lifted.

* * * * *